United States Patent
Kim et al.

(10) Patent No.: US 11,084,728 B2
(45) Date of Patent: Aug. 10, 2021

(54) METHOD FOR PRODUCING SILICA AEROGEL BLANKET AND SILICA AEROGEL BLANKET PRODUCED THEREBY

(71) Applicant: LG CHEM, LTD., Seoul (KR)

(72) Inventors: Mi Ri Kim, Daejeon (KR); Je Kyun Lee, Daejeon (KR); Kyoung Shil Oh, Daejeon (KR)

(73) Assignee: LG Chem, Ltd., Seoul (KR)

( * ) Notice: Subject to any disclaimer, the term of this patent is extended or adjusted under 35 U.S.C. 154(b) by 137 days.

(21) Appl. No.: 16/304,637

(22) PCT Filed: Mar. 22, 2018

(86) PCT No.: PCT/KR2018/003389
§ 371 (c)(1),
(2) Date: Nov. 26, 2018

(87) PCT Pub. No.: WO2018/208005
PCT Pub. Date: Nov. 15, 2018

(65) Prior Publication Data
US 2019/0276322 A1    Sep. 12, 2019

(30) Foreign Application Priority Data
May 12, 2017   (KR) .................. 10-2017-0059587

(51) Int. Cl.
*C01B 33/158* (2006.01)
*C01B 33/142* (2006.01)

(52) U.S. Cl.
CPC ........ *C01B 33/1585* (2013.01); *C01B 33/158* (2013.01); *C01B 33/142* (2013.01)

(58) Field of Classification Search
CPC .................. C01B 33/1585; C01B 33/158
See application file for complete search history.

(56) References Cited

U.S. PATENT DOCUMENTS

| | | | |
|---|---|---|---|
| 3,877,968 A * | 4/1975 | Maeno | D21H 17/25 162/176 |
| 4,717,708 A * | 1/1988 | Cheng | B01J 35/1047 502/233 |
| 6,013,821 A | 1/2000 | Lopez | |
| 9,862,614 B2 | 1/2018 | Oh et al. | |
| 10,160,655 B2 | 12/2018 | Xiang | |
| 10,260,670 B2 | 4/2019 | Kim et al. | |
| 2009/0186226 A1 * | 7/2009 | Chaumonnoi | C07F 7/1804 428/402 |
| 2010/0119432 A1 | 5/2010 | Yeo | |
| 2012/0244040 A1 | 9/2012 | Joung et al. | |
| 2016/0046495 A1 | 2/2016 | Xiang | |
| 2016/0264427 A1 | 9/2016 | Oh et al. | |
| 2018/0010726 A1 | 1/2018 | Kim et al. | |
| 2018/0179073 A1 | 6/2018 | Oh et al. | |
| 2019/0107242 A1 | 4/2019 | Kim et al. | |

FOREIGN PATENT DOCUMENTS

| | | | |
|---|---|---|---|
| CN | 103396081 A * | 11/2013 | ............. C04B 28/24 |
| EP | 2930147 A1 | 10/2015 | |
| EP | 3257812 A1 | 12/2017 | |
| EP | 3284719 A1 | 2/2018 | |
| JP | 2011190548 | 9/2011 | |
| KR | 10-0848856 | 7/2008 | |
| KR | 10-1082982 | 11/2011 | |
| KR | 10-1400721 | 5/2014 | |
| KR | 10-1434273 | 8/2014 | |
| KR | 10-2016-0122634 | 10/2016 | |
| WO | 2015/175970 | 11/2015 | |
| WO | 2016/129874 | 8/2016 | |
| WO | 2016/167494 | 10/2016 | |

OTHER PUBLICATIONS

International Search Report and Written Opinion of PCT/KR2018/003389, dated Jul. 30, 2018.
XP-002788866, Database WPI Week 201674, AN2016-65065W, Thomson Scientific—Summary of Application No. WO2016KR03152, KR20160035850, CN20168016784, EP20160780217, US20171554383, published as WO2016167494, KR20160122634, KR101748527B, CN107406327, EP3284719, US2018179073 (2017).
Supplementary Search Report of European Patent Office in Appl'n No. EP18798320, dated Feb. 26, 2019.

* cited by examiner

*Primary Examiner* — Coris Fung
*Assistant Examiner* — Michael Forrest
(74) *Attorney, Agent, or Firm* — Morgan, Lewis & Bockius LLP

(57) ABSTRACT

The present invention relates to a method for producing a silica aerogel blanket, the method comprising recovering a supercritical waste liquid generated after performing a step of supercritical drying, neutralizing the recovered supercritical waste liquid by adding an acid thereto for recycling, and reusing the recycled supercritical waste liquid, and a silica aerogel blanket produced thereby.

7 Claims, No Drawings

METHOD FOR PRODUCING SILICA AEROGEL BLANKET AND SILICA AEROGEL BLANKET PRODUCED THEREBY

CROSS-REFERENCE TO RELATED APPLICATION

This application is a National Stage Application of International Application No. PCT/KR2018/003389 filed on Mar. 22, 2018, which claims priority to Korean Patent Application No. 10-2017-0059587, filed on May 12, 2017 in the Korean Intellectual Property Office, the disclosure of which is incorporated herein in its entirety by reference.

TECHNICAL FIELD

The present invention relates to a method for producing a silica aerogel blanket, and a silica aerogel blanket produced thereby, a method for producing a silica aerogel blanket, wherein a supercritical waste liquid generated when producing a silica aerogel blanket is recycled and reused, and a silica aerogel blanket produced thereby.

BACKGROUND ART

Recently, as industrial technology becomes more advanced, interest in aerogel having excellent thermal insulation properties is increasing. Aerogel developed so far includes organic aerogel such as resorcinol-formaldehyde or melamine-formaldehyde aerogel particles, and inorganic aerogel containing metal oxides such as silica, alumina, titania, or carbon aerogel.

Among these, since silica aerogel is a highly porous material and has high porosity and specific surface area and low thermal conductivity, applications thereof are expected in various fields such as insulating materials, catalysts, sound absorbing materials, and interlayer insulating materials of semiconductor circuits. Although the commercialization rate of silica aerogel is very slow due to the complicated production process and low mechanical strength thereof, initial application items are being released as a result of continuous research, and the market for application items including insulating materials is expanding rapidly.

Silica aerogel has low mechanical strength due to the porous structure thereof. Due to this reason, silica aerogel is usually made into a product such as an aerogel blanket or an aerogel sheet by being combined with a base material such as glass fiber, ceramic fiber, or polymer fiber.

For example, in the case of a silica aerogel blanket using silica aerogel, the silica aerogel blanket is produced through a step of producing a silica sol, a step of gelation, a step of aging, a step of surface modification, and a step of supercritical drying. The silica aerogel blanket described above uses an excess of organic solvent during the production process, and therefore the organic solvent accounts for a high proportion of the production cost of the silica aerogel blanket. Furthermore, the treatment cost of used organic solvent, that is, waste liquid, is very high.

Accordingly, in order to reduce the production cost of a silica aerogel blanket, a method for reducing the amount of organic solvent to be used, or for reusing waste liquid to reduce the amount of waste liquid generated is needed

DISCLOSURE OF THE INVENTION

Technical Problem

An aspect of the present invention provides a method for producing a silica aerogel blanket capable of reducing production cost by recycling and then reusing supercritical waste liquid generated after performing a step of supercritical drying in the method for producing a silica aerogel blanket.

In addition, another aspect of the present invention provides a silica aerogel blanket which may be realized to have appearance and physical properties the same as or similar to those of a silica aerogel blanket produced only with a solvent to be used for the first time.

Technical Solution

In order to solve the problems, the present invention provides a method for producing a silica aerogel blanket, the method comprising recovering a supercritical waste liquid generated after performing a step of supercritical drying; neutralizing the recovered supercritical waste liquid by adding an acid thereto for recycling; and reusing the recycled supercritical waste liquid.

In addition, the present invention provides a silica aerogel blanket produced by the method for producing a silica aerogel blanket.

Advantageous Effects

A method for producing a silica aerogel blanket according to the present invention is capable of reducing production cost by recycling a supercritical waste liquid generated when producing a silica aerogel blanket, thereby reducing the amount of solvent to be used for the first time.

In addition, the method for producing a silica aerogel blanket according to the present invention is capable of reusing not only a supercritical waste liquid, but also aged waste liquid and surface modification waste liquid, thereby reducing the amount of not only a solvent to be used for the first time but also of a surface modifier, resulting in further reducing production cost.

In addition, a silica aerogel blanket according to the present invention may be realized to have appearance and physical properties the same as or similar to those of a silica aerogel blanket produced only with a solvent to be used for the first time, even though waste liquid generated when producing a silica aerogel blanket is reused.

BEST MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A method for producing a silica aerogel blanket of the present invention is capable of reducing production cost by recovering a supercritical waste liquid generated after performing a step of supercritical drying and then neutralizing the same to be recycled and reused, thereby reducing the amount of solvent to be used for the first time, resulting in reducing production cost of a silica aerogel blanket.

In addition, a silica aerogel blanket according to the present invention may be realized to have appearance and physical properties the same as or similar to those of a silica aerogel blanket produced only with a solvent to be used for the first time, even though waste liquid generated during producing a silica aerogel blanket is reused.

Specifically, a method for producing a silica aerogel blanket according to an embodiment of the present invention comprises recovering a supercritical waste liquid generated after performing a step of supercritical drying (Step 1); neutralizing the recovered supercritical waste liquid by adding an acid thereto for recycling (Step 2); and reusing the recycled supercritical waste liquid (Step 3).

Hereinafter, each step will be described in detail.

In a method for producing a silica aerogel blanket according to an embodiment of the present invention, Step 1 is a step of recovering a supercritical waste liquid generated after performing a step of supercritical drying.

The supercritical waste liquid may be waste liquid generated after a typical method for producing a silica aerogel is performed.

The method for producing a silica aerogel blanket may be a typical method for producing a silica aerogel blanket, and may comprise producing a silica sol (Step 1-1); preparing a wet gel-base material composite by immersing a base material for blanket in the silica sol, and adding a base to perform gelation (Step 1-2); aging the wet gel-base material composite (Step 1-3); surface modifying the aged wet gel-base material composite (Step 1-4); and supercritical drying the surface-modified wet gel-base material composite to produce a silica aerogel blanket (Step 1-5).

In the Step 1-1, the silica sol may be produced by mixing a silica precursor, water, and a polar organic solvent. When producing the silica sol, an acid catalyst such as hydrochloric acid may be selectively used.

The silica precursor may be a silicon-containing alkoxide-based compound, and more specifically tetraalkyl silicate. The tetraalkyl silicate may be one or more selected from the group consisting of tetramethoxy silane (TMOS), tetraethoxy silane (TEOS), methyl triethyl orthosilicate, dimethyl diethyl orthosilicate, tetrapropyl orthosilicate, tetraisopropyl orthosilicate, tetrabutyl orthosilicate, tetra secondary butyl orthosilicate, tetra tertiary butyl orthosilicate, tetrahexyl orthosilicate, tetracyclohexyl orthosilicate, and tetradodecyl orthosilicate. Among these, it is preferable that the tetraalkyl silicate is one or more selected from the group consisting of tetramethyl orthosilicate (TMOS) and tetraethyl orthosilicate (TEOS).

The silica precursor is hydrolyzed by water and a polar organic solvent, and as a result, silca ($SiO_2$) may be generated.

Meanwhile, as the silica precursor, pre-hydrolysates of the compounds described above may be used. In the cases of such pre-hydrolysates, a material directly produced or commercially available may be used. When produced directly, for example, a pre-hydrolysate hydrolyzed by mixing TEOS and alcohol, followed by adding an acidic aqueous solution thereto may be used.

Also, the polar organic solvent used in the production of the silica sol may be an alcohol-based solvent. The alcohol-based solvent may be, specifically, monohydric alcohol such as methanol, ethanol, isopropanol, and butanol; or polyhydric alcohol such as glycerol, ethyleneglycol, propylene glycol, diethyleneglycol, dipropyleneglycol, and sorbitol. When considering the miscibility with water and aerogel, it is preferable to use a monohydric alcohol-based solvent as the polar organic solvent.

In the Step 1-2, the base material for blanket may be a film, a sheet, a net, fiber, a porous body, foam, a non-woven body, or a laminate of two or more layers thereof. In addition, according to the use of the base material for blanket, surface roughness may be formed or patterned on the surface thereof. More specifically, the base material for blanket may be fiber capable of further improving the thermal insulation performance by including a space or a void through which an aerogel may be easily inserted into the base material for blanket. Furthermore, it is preferable that the base material for blanket preferably has a low thermal conductivity.

Specifically, the base material for blanket may include, but not particularly limited to, one or more selected from the group consisting of polyamide, polybenzimidazole, polyaramid, an acryl resin, a phenol resin, polyester, polyetheretherketone (PEEK), polyolefin (for example, polyethylene, polypropylene, or a copolymer thereof, and the like), cellulose, carbon, cotton, wool, hemp, a non-woven fabric, glass fiber, and ceramic wool. Among these, it is preferable that the base material for blanket includes one or more selected from the group consisting of glass fiber and polyethylene.

In the Step 1-2, the base may be an inorganic base such as sodium hydroxide and potassium hydroxide; or an organic base such as ammonium hydroxide. However, in the case of an inorganic base, there is a concern that a metal ion included in a compound may be coordinated to a Si—OH compound, and therefore, an organic base is preferable.

The organic base may be one or more selected from the group consisting of ammonium hydroxide ($NH_4OH$), tetramethylammonium hydroxide (TMAH), tetraethyl ammonium hydroxide (TEAH), tetrapropylammonium hydroxide (TPAH), tetrabutylammonium hydroxide (TBAH), methylamine, ethylamine, isopropylamine, monoisopropylamine, diethylamine, di isopropylamine, dibutylamine, trimethylamine, triethylamine, triisopropylamine, tributylamine, choline, monoethanolamine, diethanolamine, 2-aminoethanol, 2-(ethylamino) ethanol, 2-(methylamino) ethanol, N-methyldiethanolamine, dimethylaminoethanol, diethylaminoethanol, nitrilotriethanol, 2-(2-aminoethoxy)ethanol, 1-amino-2-propanol, triethanolamine, monopropanolamine, and dibutanol. Among these, ammonium hydroxide ($NH_4OH$) is preferable.

Since there is a concern that the base may be precipitated when inputted while being in a solid state, it is preferable that the base is added while being in a solution state, the solution diluted by the polar organic solvent.

The aging step which is the Step 1-3 is a process in which the wet gel-base material composite is left standing at an appropriate temperature such that a chemical change thereof may be completely achieved. By the aging process for the wet gel-base material composite, the mesh structure inside the wet gel may be enhanced. In addition, during the aging process, the moisture inside the wet gel may be substituted with the polar organic solvent, and as a result, it is possible to prevent deformation and reduction of the pore structure of the silica gel due to the evaporation of moisture inside the wet gel in the subsequent supercritical drying process.

The aging step may be performed until the chemical change in the wet gel-base material composite is completed.

The aging step may be performed by immersing the wet gel-base material composite in an aging solution for 1 to 6 hours at 50 to 80° C., or for 2 to 4 hours at 60 to 75° C. Between the two, it is preferable that the aging step is performed by immersing the wet gel-base material composite in the aging solution for 2 to 4 hours at 60 to 75° C.

When the conditions described above are satisfied, the consumption of energy may be minimized while the aging reaction may be sufficiently achieved.

The aging solution may be a polar organic solvent, and the description of the polar organic solvent is the same as described above.

Aged waste liquid generated during the step of aging may be recovered and reused, and the detailed description thereof will be followed later.

The Step 1-4 may be performed by immersing the aged wet gel-base material composite in a surface modification solution for 1 to 6 hours at 40 to 80° C., or for 2 to 5 hours at 50 to 80° C. Between the two, it is preferable that the Step 1-4 is performed for 2 to 5 hours at 50 to 80° C.

When the conditions described above are satisfied, the consumption of energy may be minimized while the surface modification reaction may be sufficiently achieved.

The surface modification solution may be a solution including one or more selected from the group consisting of hexamethyldisilazane (HMDS), trimethyl chlorosilane (TMSCL), silicone oil, amino silane, alkyl silane, polydimethyl siloxane (PDMS), and dimethyl dichlorosilane (DDS), and a polar organic solvent. The description of the polar organic solvent is the same as described above.

Surface modification waste liquid generated during the step of surface modification may be recovered and reused, and the detailed description thereof will be followed later.

The Step 1-5 may be a step of supercritical drying using supercritical carbon dioxide.

Carbon dioxide ($CO_2$) is in a gaseous state at room temperature and atmospheric pressure. However, when temperature and pressure exceed a predetermined temperature and a pressure limit called a supercritical point, an evaporation process does not occur so that carbon dioxide becomes to be in a critical state in which gas and liquid cannot be distinguished. Carbon dioxide in such critical state is referred to a supercritical carbon dioxide. Supercritical carbon dioxide has a molecular density close to that of liquid, but has a low viscosity, thereby having properties close to those of gas, a high diffusion rate, and high thermal conductivity so that drying process time may be shortened.

Meanwhile, the step of supercritical drying may be performed by placing the surface-modified wet gel-base material composite into a supercritical drying reactor, filling the reactor with $CO_2$ in a liquid state, and substituting a solvent inside the silica aerogel with $CO_2$, which is a solvent substitution process.

In the step of supercritical drying, sufficiently high temperature and pressure are maintained from the beginning of the supercritical drying to the end thereof so as to increase the penetration rate of $CO_2$ enough to penetrate inside of wet gel, thereby sufficiently removing an organic solvent present inside the wet gel.

Accordingly, the temperature of a reactor in which the supercritical drying process is performed is raised to 40 to 90° c. at a predetermined temperature raising rate, specifically, 0.1° C./min to 10° C./min, and the pressure which is greater than a pressure at which carbon dioxide becomes to be in a supercritical state, specifically, pressure of 100 bar to 150 bar is maintained to allow the carbon dioxide to remain in a supercritical state for a certain amount of time, specifically for 20 minutes to 10 hours.

When the conditions described above are satisfied, an aerogel blanket having excellent physical properties may be obtained without breaking the pores in the gel in a short time.

As a result of the supercritical drying process described above, a blanket containing porous silica aerogel having nano-sized pores may be produced. The silica aerogel has excellent physical properties, especially high porosity, along with high hydrophobicity, and a silica aerogel blanket containing the same may have excellent mechanical flexibility along with low thermal conductivity.

In the Step 1, the supercritical waste liquid is recovered while the supercritical drying step is being performed, or after the supercritical drying step is completed.

The supercritical waste liquid may be a solution containing a solution generated by substituting a solution present in the wet gel with $CO_2$, and surface modification waste liquid remaining in the wet gel-base material composite whose surface has been modified. As the solution present in the wet gel and the surface modification waste liquid are subjected to the supercritical drying step, ammonia, which is a reaction by-product of the surface modifier present on the surface of the wet gel, may be reacted with $CO_2$ to generate ammonium carbonate. The ammonium carbonate may be partially removed in a filter in the supercritical equipment, but may also remain in the supercritical waste liquid and increase the pH of the waste liquid.

In the method for producing a silica aerogel blanket according to the present invention, Step 2 is a step of neutralizing the recovered supercritical waste liquid by adding an acid thereto for recycling.

The recovered supercritical waste liquid may be reused in the production of a silica sol, which is to be described later, by being neutralized. The silica sol produced from the recovered supercritical waste liquid by the neutralization may be realized to have storage stability the same as or similar to that of the silica sol produced only with a polar organic solvent to be used for the first time. Accordingly, when the silica sol produced from the recovered supercritical waste liquid is applied to mass production, the process efficiency may not be lowered. In addition, the silica sol produced from the recovered supercritical waste liquid may be subjected to gelation at a desired point in time and for a desired period of time with a base, and thus a silica aerogel blanket having uniform physical properties may be produced.

If the recovered supercritical waste liquid is not neutralized, a silica sol produced from a supercritical waste liquid not neutralized may be subjected to gelation without a catalyst, so that it is difficult to control the gelation process, and thus a silica aerogel blanket of excellent quality may not be produced.

The acid may be acetic acid or hydrochloric acid, and may be added in an amount of 0.2 to 1.5 parts by weight based on 100 parts by weight of the recovered supercritical waste liquid.

Specifically, when the acid is acetic acid, the acid may be added in an amount of 0.5 to 1.3 parts by weight, specifically 0.6 to 1.1 parts by weight.

When the acid is hydrochloric acid, the acid may be added, specifically, in an amount of 0.2 to 0.7 parts by weight, more specifically 0.3 to 0.6 parts by weight.

When the range described above is satisfied, the recovered supercritical waste liquid may be neutralized without deteriorating physical properties. Furthermore, the recycled supercritical waste liquid may be prevented from being excessively acidified, and the residual acid may be prevented from reacting with a gelling catalyst to generate undesired salts.

The acid may be added while being in a state of an acidic solution containing water and a polar organic solvent.

The weight ratio of acid, a polar organic solvent and water in the acidic solution may be 1:(50-200):(5-20), specifically 1:(100-150):(10-15).

When the range described above is satisfied, the generation of gas during the neutralization process of the supercritical waste liquid may be minimized.

The description of the polar organic solvent is the same as described above.

The pH of the recycled supercritical waste liquid may be 2 to less than 7.5.

The pH of the supercritical waste liquid which is neutralized with acetic acid and recycled may be 6 to less than 7.5, specifically, 6 to 6.5.

The pH of the supercritical waste liquid which is neutralized with hydrochloric acid and recycled may be 2 to 3, specifically, 2 to 2.5.

When the range described above is satisfied, when preparing a silica using the recycled supercritical waste liquid, it is possible to realize a storage stability the same as or similar to that of the silica sol produced by a polar organic solvent to be used for the first time, and the gelation time of the wet gel-base material composite may be controlled through a base. In addition, since the gelation of the silica sol does not proceed without a base, the process efficiency may increase and the gelation time may be controlled, so that the physical properties of a silica aerogel blanket which is the final product may remain constant.

Meanwhile, an ammonium ion may be present in the recycled supercritical waste liquid.

In the method for producing a silica aerogel blanket according to an embodiment of the present invention, Step 3 is a step of reusing the recycled supercritical waste liquid.

Specifically, the recycled supercritical waste liquid may be reused in a step of producing a silica sol in the method for producing a silica aerogel blanket.

Hereinafter, the method for producing a silica aerogel blanket using a recovered and recycled supercritical waste liquid will be specifically described with reference to Steps 3-1 to 3-5.

The step of preparing the silica sol (Step 3-1) is the same as Step 1-1 except that a silica precursor, water, the recycled supercritical waste liquid, and a polar organic solvent are missed.

The polar organic solvent used in the Step 3-1 means a polar organic solvent to be used for the first time, and the description of the polar organic solvent is the same as described above.

The recycled supercritical waste liquid may be used in an amount of less than 80 wt %, specifically 10 to 75 wt %, more specifically 50 to 75 wt %, based on the total polar organic solvent used in the step of preparing the silica sol, that is the total weight of the recycled supercritical waste liquid and the polar organic solvent to be used for the first time.

When the range described above is satisfied, when compared with a silica aerogel blanket produced only with a polar organic solvent to be used for the first time, a silica aerogel blanket having the same or similar level of appearance and physical properties may be produced. In addition, the production cost and the treatment cost of waste liquid may be reduced.

Subsequently, a step of preparing a wet gel-base material composite by immersing a base material for blanket in the silica sol produced using the recycled supercritical waste liquid and adding a base to perform gelation (Step 3-2) may be performed. The Step 3-2 is the same as the Step 1-2 described above except that the recovered supercritical waste liquid is used.

After the Step 3-2 is performed, any one or more steps of the stabilization step and the pre-aging step described in the Step 1 may be further performed.

Subsequently, a step of aging the wet gel-base material composite (Step 3-3) may be performed. In the Step 3-3, an aging solution to be used for the first time may be used, or the aged waste liquid generated in the Step 1-3 may be reused.

When only the aging solution to be used for the first time is used in the Step 3-3, the step 3-3 may be the same as the Step 1-3.

When the aged waste liquid generated in the Step 1-3 is reused, one or more selected from the group consisting of the aged waste liquid, the aging solution to be used for the first time, and the supercritical waste liquid may be mixed and used. At this time, the supercritical waste liquid may be the supercritical waste liquid generated in the Step 1-5.

Meanwhile, the description of the aging solution to be used for the first time is the same as described above in the Step 1-3.

The aged waste liquid may be used, specifically, in an amount of more than 90 wt %, more specifically more than 95 wt %, based on the total aging solution used in the Step 3-3, that is, the total weight of one or more selected from the group consisting of the aged waste liquid, the aging solution to be used for the first time, and the supercritical waste liquid.

When the range described above is satisfied, when compared with a silica aerogel blanket produced only with aging solution to be used for the first time, a silica aerogel blanket having the same or similar level of appearance and physical properties may be produced. In addition, the production cost and the treatment cost of waste liquid may be reduced.

The number of times of reuse of the aged waste liquid is not particularly limited. Even through the aged waste liquid is reused, when compared with a silica aerogel blanket produced only with aging solution to be used for the first time, a silica aerogel blanket having the same or similar level of appearance and physical properties may be produced.

The aged waste liquid may be reused without a separate processing because no separate additive are added to the aging solution in the aging step, and the inside of the wet gel-base material composite is filled with an alcohol solvent containing a small amount of water, so that the moisture content of the aging solution does not increase higher than a predetermined level.

Subsequently, a step of surface modifying the aged wet gel-base material composite (Step 3-4) may be performed.

In the Step 3-4, only a surface modification solution to be used for the first time may be used, or the surface modification waste liquid generated in the Step 1-4 may be reused.

When the surface modification solution to be used for the first time is used in the Step 3-4, the Step 3-4 may be the same as the Step 1-4.

When the surface modification waste liquid generated in the Step 1-4 is reused, one or more selected from the group consisting of the surface modification waste liquid, the aging solution to be used for the first time, and the supercritical waste liquid may be mixed and used. At this time, the supercritical waste liquid may be the supercritical waste liquid generated in the Step 1-5.

The surface modification waste liquid may be used in an amount of more than 80 wt %, specifically more than 90 wt %, more specifically more than 95 wt % based on the total surface modification solution used in the Step 3-4, that is, the total weight of one or more selected from the group consisting of the surface modification waste liquid, the aging solution to be used for the first time, and the supercritical waste liquid.

When the range described above is satisfied, when compared with a silica aerogel blanket produced only with a surface modification solution to be used for the first time, a silica aerogel blanket having the same or similar level of appearance and physical properties may be produced. In addition, the production cost and the treatment cost of waste liquid may be reduced.

The content of a surface modifier in the surface modification solution to be used for the first time which is used in the Step 3-4 may be 60 to 100 wt %, specifically 80 to 100 wt %, more specifically 80 to 90 wt %, based on the content of a surface modifier in the surface modification solution to be used for the first time which is used in the Step 1-4.

When the range described above is satisfied, even though the number of times of reuse of the surface modification waste liquid increases, the content of the surface modifier and that of by-products derived from the surface modifier in the surface modification waste liquid may remain constant.

The number of times of reuse of the surface modification waste liquid is not particularly limited. Even through the surface modification waste liquid is reused, when compared with a silica aerogel blanket produced only with surface modification waste liquid to be used for the first time, a silica aerogel blanket having the same or similar level of appearance and physical properties may be produced.

The surface modification waste liquid may also be reused without a separate processing because the inside of the aged wet gel-base material composite is filled with an alcohol solvent containing a small amount of water, so that the moisture content of the surface modification solution does not increase higher than a predetermined level. In addition, since the reaction in which the surface modifier modifies the surface of the wet gel and generate by-products is a reversible reaction which is affected by the moisture content in the solution and the like, even when the surface modifier is added, the concentration of the reaction by-products remaining after the surface modification of the wet gel is not infinitely increased, but balanced at a predetermined level. Accordingly, the composition of the surface modification waste liquid is maintained to have substantially constant values, so that the surface modification waste liquid may not contain much impurities affecting the surface modification step, albeit waste liquid for surface modification.

If necessary, a step of filtration may be further included to remove solid impurities such as silica remaining in the aged waste liquid and the surface modification waste liquid.

Subsequently, a step of producing a silica aerogel blanket by supercritical drying the surface-modified wet gel-base material composite (Step 3-5) may be performed.

A supercritical waste liquid generated in the Step 3-5 may be recovered using a separate separator, and the supercritical waste liquid may be a solution containing a solution generated by substituting a solution present in the wet gel with $CO_2$, and surface modification waste liquid remaining in the wet gel-base material composite whose surface has been modified. When the solution present in the wet gel and the surface modification waste liquid are subjected to the supercritical drying step, ammonia, which is a reaction by-product of the surface modifier present on the surface of the wet gel, may be reacted with $CO_2$ to generate ammonium carbonate. The ammonium carbonate may be partially removed in a filter in the supercritical equipment, but may also remain in the supercritical waste liquid and increase the pH of the waste liquid.

Meanwhile, the solution generated by being substituted with $CO_2$ may contain a solution derived from a solution selected from the group consisting of the aged waste liquid, the surface modification waste liquid, and the supercritical waste liquid.

The supercritical waste liquid may be reused in a method for producing a silica aerogel blanket according to an embodiment of the present invention.

A silica aerogel blanket according to another embodiment of the present invention is produced by a method for producing a silica aerogel blanket according to an embodiment of the present invention.

The silica aerogel blanket according to another embodiment of the present invention may have a thermal conductivity of 16 to 21 mW/mK, and the carbon content thereof may be 8 to 12 wt % based on the total weight of the silica aerogel. When the range described above is satisfied, the silica aerogel blanket may have appearance and physical properties the same as or similar to those of a silica aerogel blanket produced only with a solvent to be used for the first time.

Meanwhile, the total weight of silica aerogel, which is a reference for carbon content, is obtained by subtracting the weight of the base material for blanket from the total weight of the silica aerogel blanket.

MODE FOR CARRYING OUT THE INVENTION

Hereinafter, examples of the present invention will be described in detail so that those skilled in the art can easily carry out the present invention. The present invention may, however, be embodied in many different forms and is not limited to the examples set forth herein.

Preparation Example 1 to Preparation Example 8 and Comparative Preparation Example 1

To a mixed solution prepared by mixing tetraethyl orthosilicate (TEOS) and ethanol at a weight ratio of 3:1, a solution of hydrochloric acid diluted with water (concentration: 0.15 wt %) was added such that the pH of the mixed solution was to be 1 and then mixed to prepare a silica sol (silica content in the silica sol=4 wt %). Next, to the silica sol, an ammonia catalyst was added at a volume ratio of 100:0.5 (silica sol:ammonia catalyst), and glass fiber was deposited for gelation to prepare a wet gel-base material composite.

Thereafter, the wet gel-base material composite was immersed in ethanol, and then aged for 2 hours in an oven of 70° C. The aged waste liquid generated during the aging was recovered.

The aged wet gel-base material composite was surface modified for 5 hours at 70° C. using a surface modification solution which is a mixture of ethanol and HMDS (volume ratio of ethanol:HMDS: 1:19). Surface modification waste liquid generated during the surface modification was recovered.

Subsequently, the surface-modified wet gel-base material composite was placed in an extractor in the supercritical equipment, subjected to supercritical drying using supercritical $CO_2$, and was dried for 1 hour at 150° C. and atmospheric pressure to produce a silica aerogel blanket.

To 100 g of the recovered supercritical waste liquid, acid was added in the amounts shown in Table 1 below to prepare recycled supercritical waste liquid having the pH shown in Table 1 below.

The recycled supercritical waste liquid, ethanol, water, and TEOS were mixed to prepare a recycled silica sol (weight ratio of recycled supercritical waste liquid, ethanol, water, and $SiO_2$ in the recycled silica sol: 11:4.5:0.8:1). In this case, ethanol is ethanol to be used for the first time, and the pH of Comparative Preparation Example 1 refers to the pH of the recovered supercritical waste liquid.

TABLE 1

| Classification | Acid | | pH of the recovered supercritical waste liquid |
|---|---|---|---|
| | Type | Content (ml) | |
| Preparation Example 1 | Acetic acid | 0.24 | 7.2 |
| Preparation Example 2 | Acetic acid | 0.40 | 6.8 |
| Preparation Example 3 | Acetic acid | 0.48 | 6.7 |
| Preparation Example 4 | Acetic acid | 0.56 | 6.6 |
| Preparation Example 5 | Acetic acid | 0.64 | 6.5 |
| Preparation Example 6 | Acetic acid | 0.72 | 6.4 |
| Preparation Example 7 | Acetic acid | 1.00 | 6.3 |
| Preparation Example 8 | Hydrochloric acid | 0.3 | 2.2 |
| Comparative Preparation Example 1 | — | — | 8.0 |

Comparative Preparation Example 2

Ethanol to be used for the first time, water, and TEOS were mixed to prepare a silica sol (weight ratio of ethanol:water:$SiO_2$=15.5:0.8:1 in silica sol).

Experimental Example 1

To evaluate the storage stability of the recycled silica sol, the time at which the recycled silica sol was started to gel without a base at room temperature is shown in Table 2 below. Meanwhile, in the cases of the recycled silica sol of Preparation Example 7, Preparation Example 8 and Comparative Preparation Example 2, the measurement was performed only up to 36 hours, and therefore, the gelation start time was described as exceeding 36 hours.

TABLE 2

| Classification | Gelation start time |
|---|---|
| Preparation Example 1 | 6.0 hours |
| Preparation Example 2 | 17.5 hours |
| Preparation Example 3 | 20.0 hours |
| Preparation Example 4 | 21.5 hours |
| Preparation Example 5 | 22.5 hours |
| Preparation Example 6 | 26.0 hours |
| Preparation Example 7 | >36.0 hours |
| Preparation Example 8 | >36.0 hours |
| Comparative Preparation Example 1 | 1.0 hour |
| Comparative Preparation Example 2 | >36.0 hours |

Referring to Table 2, in the cases of the recycled silica sol of Preparation Example 1 to Preparation Example 8, the gelation started 6 hours or more elapsed after the preparation, and therefore, it could be confirmed that the storage stability was excellent. Particularly, in the case of the recycled silica sol of Preparation Example 6 to Preparation Example 8, the gelation started 24 hours or more elapsed after the preparation, and therefore, it could be confirmed that the recycled silica sol thereof had the gelation start time similar to that of the silica sol of Comparative Preparation Example 2.

In addition, in the case of the silica sol of Comparative Preparation Example 1 in which the recovered supercritical waste liquid was not recycled, the gelation start time is 1 hour, and therefore, when introduced into a mass production process, the gelation may progress in a line through which the silica sol passes causing the line to be clogged or the flow rate of the silica sol in the line to be lowered, thereby deteriorating the process efficiency.

Example 1

To the recycled silica sol of Preparation Example 8, an ammonia catalyst was added at a volume ratio of 100:0.5 (silica sol:ammonia catalyst), and the glass fibers were deposited for gelation to prepare a wet gel-base material composite. Thereafter, the wet gel-base material composite was immersed in ethanol to be used for the first time, and then aged for 2 hours in an oven of 70° C. The aged wet gel-base material composite was surface modified for 5 hours at 70° C. using a surface modification solution which is a mixture of ethanol to be used for the first time and HMDS (volume ratio of ethanol:HMDS: 1:19). Subsequently, the surface-modified wet gel-base material composite was placed in an extractor in the supercritical equipment, subjected to supercritical drying using supercritical $CO_2$, and was dried for 1 hour at 150° C. and atmospheric pressure to produce a silica aerogel blanket.

Example 2

A silica aerogel blanket was produced in the same manner as in Example 1, except that the recycled silica sol of Preparation Example 6 was used.

Example 3

A silica aerogel blanket was produced in the same manner as in Preparation Example 6, except that the recycled silica sol of Preparation Example 6 was used; a mixed solution in which the aged waste liquid recovered in Preparation Example 6 and the supercritical waste liquid (untreated with acid) recovered in Preparation Example 6 were mixed at a weight ratio of 95:5 was used in the aging step; and a mixed solution in which the surface modification waste liquid recovered in Preparation Example 6 and the supercritical waste liquid (untreated with acid) recovered in Preparation Example 6 were mixed at a weight ratio of 95:5 was used in the surface modification step.

Example 4

A silica aerogel blanket was produced in the same manner as in Example 3, except that a supercritical waste liquid recycled from the supercritical waste liquid recovered in Example 3 (weight ratio of the recovered supercritical waste liquid to the acetic acid: 100:0.8), ethanol to be used for the first time, water, and $SiO_2$ were mixed at a weight ratio of 11:4.5:0.8:1 to prepare a silica sol, a mixed solution in which the aged waste liquid recovered in Example 3 and the supercritical waste liquid (untreated with acid) recovered in Example 3 were mixed at a weight ratio of 95:5 was used in the aging step, and a mixed solution in which the surface modification waste liquid recovered in Example 3 and the supercritical waste liquid (untreated with acid) recovered in Example 3 were mixed at a weight ratio of 95:5 was used in the surface modification step.

Example 5

A silica aerogel blanket was produced in the same manner as in Example 3, except that a supercritical waste liquid recycled from the supercritical waste liquid recovered in Example 4 (weight ratio of the recovered supercritical waste liquid to the acetic acid: 100:0.8), ethanol to be used for the first time, water, and $SiO_2$ were mixed at a weight ratio of 11:4.5:0.8:1 to prepare a silica sol, a mixed solution in which the aged waste liquid recovered in Example 4 and the supercritical waste liquid (untreated with acid) recovered in Example 4 were mixed at a weight ratio of 95:5 was used in the aging step, and a mixed solution in which the surface modification waste liquid recovered in Example 4 and the supercritical waste liquid (untreated with acid) recovered in Example 4 were mixed at a weight ratio of 95:5 was used in the surface modification step.

Comparative Examples 1

There was an attempt to produce a silica aerogel blanket by the method described in Comparative Preparation Example 1, except that the recycled silica sol of Comparative Preparation Example 1 was used, and the step of recycling the supercritical waste liquid to prepare a silica sol was not performed. However, the gelation of the silica sol started too early so that a silica aerogel blanket was not produced.

Comparative Examples 2

A silica aerogel blanket was produced in the same manner as in Example 1, except that the silica sol of Comparative Preparation Example 2, aging solution to be used for the first time, a surface modification solution, and a supercritical solution were used.

Experimental Example 2

The surface modification waste liquid recovered in the surface modification step during the production process of the silica aerogel blanket of Example 1 to Example 5 and Comparative Example 2 was subjected to GC analysis (GC/MS (EQC-0248)), and the results are shown in Table 3.

TABLE 3

| Classification | Trimethylsilanol (wt %) | Hexamethyl-disiloxane (wt %) | Trimethyl-ethoxysilane (wt %) | Total (wt %) |
|---|---|---|---|---|
| Example 1 | 1.33 | 0.02 | 0.34 | 1.69 |
| Example 2 | 1.35 | 0.02 | 0.33 | 1.70 |
| Example 3 | 2.20 | 0.04 | 0.71 | 2.95 |
| Example 4 | 2.80 | 0.10 | 0.98 | 3.88 |
| Example 5 | 3.20 | 0.09 | 1.30 | 4.59 |
| Comparative Example 2 | 1.30 | 0.01 | 0.30 | 1.61 |

Referring to Table 3, as the number of times of reuse of the surface modification waster liquid is increased, the content of trimethylsilanol, hexamethyldisiloxane, and trimethylethoxysilane which are by-products derived from HMDS, which is a surface modifier in the surface modification waste liquid, is increased.

Experimental Example 3

The thickness, thermal insulation and hydrophobicity of the silica aerogel blanks of Example 1 to Example 5 and Comparative Example 2 were evaluated, and the results are shown in Table 4 below.
1) Thickness and thermal insulation evaluation method: Measured using HFM436 Lambda of NETZSCH Co.
2) Hydrophobicity evaluation method: Measured using CS-800 of EUTRA Co.

TABLE 4

| Classification | Thickness (mm) | Thermal insulation evaluation (Thermal conductivity (mW/mk)) | Hydrophobicity evaluation method (Carbon content (wt %) based on total weight of silica aerogel) |
|---|---|---|---|
| Example 1 | 10.6 | 18.9 | 10.9 |
| Example 2 | 10.8 | 19.2 | 10.8 |
| Example 3 | 10.9 | 19.4 | 10.8 |
| Example 4 | 11.0 | 19.6 | 11.1 |
| Example 5 | 10.7 | 19.3 | 11.2 |
| Comparative Example 2 | 10.9 | 19.0 | 9.8 |

Referring to Table 4, it was confirmed that the silica aerogel blankets of Example 1 to Example 5 realized a similar level of thickness, thermal insulation, and hydrophobicity when compared with those of the silica aerogel blanket of Comparative Example 2 using only the solvent to be used for the first time. According to the results, it was confirmed the production cost may be reduced without changing the appearance and deteriorating physical properties of the silica aerogel blanket, which is the final product of the present invention.

The invention claimed is:
1. A method for producing a silica aerogel blanket, comprising:
   producing a silica sol;
   preparing a wet gel-base material composite by immersing a base material for a blanket in the silica sol, and adding a base to perform gelation to yield the wet gel-base material composite;
   aging the wet gel-base material composite;

surface modifying the aged wet gel-base material composite;

supercritical drying the surface-modified wet gel-base material composite to produce the silica aerogel blanket and a supercritical waste liquid;

recovering the supercritical waste liquid;

neutralizing the recovered supercritical waste liquid by adding an acid thereto to yield a recycled supercritical waste liquid; and reusing the recycled supercritical waste liquid:
(a) in producing the silica sol; or
(b) in aging the wet gel-base material composite; or
(c) in surface modifying the aged wet gel-base material composite; or
(d) any combination of (a)-(c), wherein the acid is added in an amount of 0.2 to 1.5 parts by weight based on 100 parts by weight of the recovered supercritical waste liquid.

2. The method of claim 1, wherein the acid is acetic acid or hydrochloric acid.

3. The method of claim 1, wherein the acid is added while being in a state of an acidic solution comprising water and a polar organic solvent.

4. The method of claim 1, wherein the recycled supercritical waste liquid is reused in producing the silica sol in an amount of less than 80 wt % based on the total polar organic solvent used in producing the silica sol.

5. The method of claim 1 further comprising a step of reusing one or more waste liquids selected from the group consisting of an aged waste liquid and a surface modification waste liquid.

6. The method of claim 5, wherein the aged waste liquid is reused in the aging of the wet gel-base material composite.

7. The method of claim 5, wherein the surface modification waste liquid is reused in the surface modifying of the aged wet gel-base material composite.

* * * * *